US008215675B2

(12) United States Patent
Sealy et al.

(10) Patent No.: US 8,215,675 B2
(45) Date of Patent: Jul. 10, 2012

(54) RESTRAINT SYSTEM FOR A SEAT BELT DEVICE

(75) Inventors: Mark Edward Byers Sealy, Warwickshire (GB); Hugh Christopher Bramley, Oxon (GB); Graham Barber, West Midlands (GB)

(73) Assignee: Norgren Limited, Staffordshire (GB)

( * ) Notice: Subject to any disclaimer, the term of this patent is extended or adjusted under 35 U.S.C. 154(b) by 132 days.

(21) Appl. No.: 12/744,410

(22) PCT Filed: Dec. 10, 2008

(86) PCT No.: PCT/GB2008/004054
§ 371 (c)(1),
(2), (4) Date: May 24, 2010

(87) PCT Pub. No.: WO2009/074784
PCT Pub. Date: Jun. 18, 2009

(65) Prior Publication Data
US 2010/0244542 A1  Sep. 30, 2010

(30) Foreign Application Priority Data

Dec. 12, 2007 (GB) .................................. 0724215.9

(51) Int. Cl.
B60R 22/36 (2006.01)
(52) U.S. Cl. ...................................... 280/806; 280/808
(58) Field of Classification Search .................. 280/808, 280/806, 805, 807
See application file for complete search history.

(56) References Cited

U.S. PATENT DOCUMENTS 5,653,398 A   8/1997 Fohl
7,178,835 B2  2/2007 Hippel et al.

FOREIGN PATENT DOCUMENTS

| DE | 4421758 A1 | 1/1996 |
|----|------------|--------|
| DE | 102005014521 A1 | 10/2006 |
| WO | 8901430 A1 | 2/1989 |
| WO | 0145985 A1 | 6/2001 |
| WO | 2004108487 A1 | 12/2004 |

*Primary Examiner* — Eric Culbreth
(74) *Attorney, Agent, or Firm* — The Ollila Law Group LLC

(57) ABSTRACT

A restraint system (14) for a seat belt (22) is provided according to an embodiment of the invention. The restraint system (14) comprises one or more pneumatic ports (42, 44) for actuating the restraint system (14) from a first position to a second position. The restraint system (14) also comprises one or more pyrotechnic ports (52, 54) for actuating the restraint system (14) from either the first position or the second position to a third position.

19 Claims, 7 Drawing Sheets

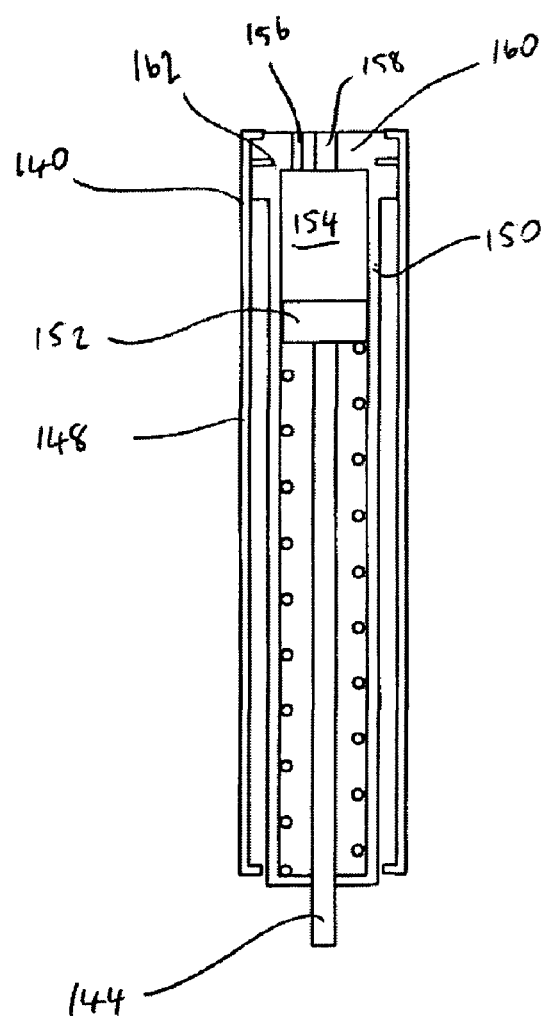
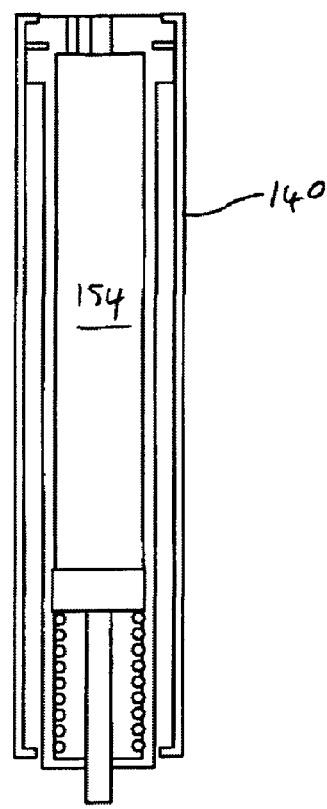
Figure 6
Figure 7

RESTRAINT SYSTEM FOR A SEAT BELT DEVICE

TECHNICAL FIELD

The present invention relates to vehicle seat belt systems and in particular, but not exclusively, to an actuation means for pre-tensioning the belt in the event of a vehicle collision or other emergency.

BACKGROUND OF THE INVENTION

Modern vehicles are frequently provided with seat belts which can be pre-tensioned in the event of a collision or impending collision. The purpose of this pre-tensioning is to restrain the occupant in their seat so as to minimize acceleration of the occupant. This in turn minimizes the effect of the impact of the collision on the body.

Additionally vehicles may be provided with a selectable pre-tensioning mode which holds the seat occupant more firmly on demand. Such selectable pre-tensioning is provided, for example, upon selecting a vehicle "Sport" mode.

In known systems, pre-tensioning (both selectable and emergency) is achieved by actuating the belt itself, or one or more of the three seat belt fixing points, namely the inertia reel mount point, the B-pillar mount point and the buckle mount point. The inertia reel is mounted to the floor of the vehicle chassis and serves three purposes; firstly to hold the belt against the occupant's body in normal use, secondly to retrieve and coil up the seat belt when the belt is not in use, and thirdly to lock the belt in position in the event of an accident. The shoulder mount point is located towards the top of the B-pillar of the vehicle above the shoulder of the occupant. The buckle mount point is positioned inboard of the occupant's seat and is fixed to the vehicle floor.

Pre-tensioning is typically provided by either providing additional rotary input to the inertia reel or providing additional linear input to one of the attachment points or the belt itself. However, each of these solutions has associated problems.

Providing the inertia reel with additional rotary input is most commonly achieved using pneumatic power to provide the pre-tensioning rotation and a clutch to allow the reel to rotate independently of the pneumatic power during normal use. However it is necessary to provide gearing in order to generate the necessary force for activation. The gearing takes up additional space within the inertia reel due to the complexity of the mechanism. Furthermore, any increase in the diameter of the inertia reel increases the torque which the pre-tensioning mechanism must achieve in order to pre-tension the belt, which places a further burden on the gearing mechanism.

In the alternative, a linear input to the belt is technically simpler to achieve by provision of a linear pneumatic actuator. However such solutions only offer a limited pre-tensioning functionality, that pre-tensioning being limited by the length of the actuator stroke.

These problems are even more acute given the need for both selective and emergency actuation. It is an object of the present invention to at least mitigate some of the above problems.

SUMMARY OF THE INVENTION

Accordingly, there is provided an actuator for pre-tensioning a vehicle seat belt, the actuator having a mount point for attaching the actuator to a car chassis, an output for engaging the seat belt, the output pneumatically operable under normal operating conditions between a first position and a second position, the output being pyrotechnically operable from any position between, and including, the first and second position to a third position so as to achieve further pre-tensioning of the seat belt in response to a collision event.

Advantageously, the provision of a pneumatic operating range (between the first and second positions) allows for the selectable pre-tensioning of the seat belt under normal operating conditions, for example so as to retain the occupant more firmly in their seat when a particular vehicle performance setting is selected. Since the pneumatic operating range is reversible, that is to say that the pre-tensioning can be activated and then subsequently released, a degree of controllable pre-tensioning is provided. This is provided by the pneumatic operating range. However, in the event of a collision or impending collision, the pyrotechnic operating regime is initiated which very rapidly moves the actuator from the first or second position or any position there between, to the fully pre-tensioned third position.

Aspects

According to an aspect of the invention, a restraint system for a seat belt comprises:
  one or more pneumatic ports for actuating the restraint system from a first position to a second position; and
  one or more pyrotechnic ports for actuating the restraint system from either the first position or the second position to a third position.

Preferably, the restraint system further comprises an inertia reel adapted to rotate about a center shaft and including a belt drum for receiving the seat belt.

Preferably, the inertia reel comprises a drum driver rotatably mounted around a drive key, wherein the one or more pneumatic ports are located in a portion of the drive key.

Preferably, pneumatic pressure supplied to one of the pneumatic ports actuates the drum driver from a first position to a second position.

Preferably, at least one of the one or more pyrotechnic ports is located in a portion of the drive key.

Preferably, pressure supplied through one or more of the pyrotechnic ports actuates the drive key from a first position to a second position to actuate the restraint system from either the first position or the second position to the third position.

Preferably, the restraint system further comprises a linear actuator system coupled to the seat belt.

Preferably, the linear actuator system comprises an first cylinder, a second cylinder, and an output.

Preferably, a pneumatic actuation increases the pressure within the first cylinder to actuate the restraint system from the first position to the second position.

Preferably, a pyrotechnic actuation increases the pressure within the second cylinder to actuate the restraint system from the first or the second position to the third position.

Preferably, the restraint system further comprises a frangible portion (162).

According to another aspect of the invention, an inertia reel for a restraint system comprises:
  a drive key including one or more pneumatic ports;
  a center shaft including one or more pyrotechnic ports; and
  drum driver positioned around the drive key and the center shaft and movable between a first position, a second position, and at least a third position.

Preferably, a pneumatic actuation increases pressure supplied by the pneumatic ports to actuate the drum driver from the first position to the second position.

Preferably, a pyrotechnic actuation increases pressure supplied by the pyrotechnic ports to actuate the drum driver from either the first or the second position to the third position.

Preferably, the drive key further comprises an actuation ridge that engages a drive ridge formed on the drum driver when the drum driver is in the first position.

Preferably, the center shaft further comprises a groove that engages a ridge formed in the drive key when the drum driver is in the first position or the second position.

According to another aspect of the invention, a linear actuator for a restraint system comprises:
- a compressed gas port in communication with a first cylinder and a piston;
- a pyrotechnic port in communication with a second cylinder; and
- an output coupled to the piston and extending from the first and second cylinders, the output movable between a first position, a second position, and at least a third position.

Preferably, pressure supplied to the compressed gas port actuates the output from the first position to the second position.

Preferably, pressure supplied to the pyrotechnic port actuates the output from either the first position or the second position to the at least third position.

Preferably, the linear actuator further comprises a frangible section positioned between the first cylinder and a base.

Preferably, the output is coupled to a seat belt.

BRIEF DESCRIPTION OF THE DRAWINGS

FIG. 6 is a view of the pre-tensioning actuator of FIG. 5 in its first (rest) position;

FIG. 7 is a view of the pre-tensioning actuator of FIG. 5 shown in its second (pneumatically actuated) position;

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
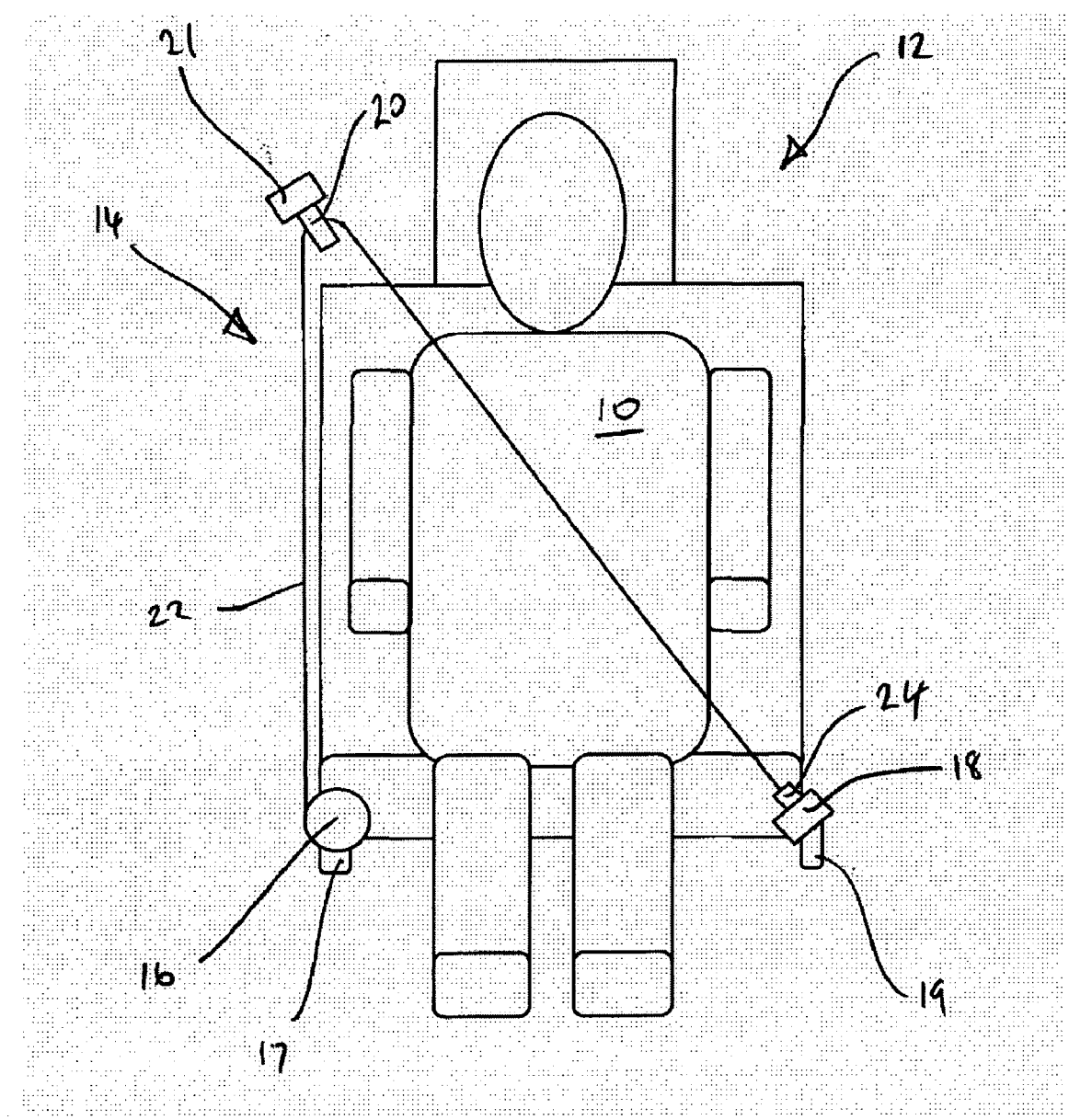
FIG. 1 is a schematic representation of a vehicle seat with an inertia reel including the seat belt pre-tensioning actuator according to a first embodiment of the invention.

FIG. 1 shows a vehicle occupant 10 sitting in a vehicle seat 12 according to an embodiment of the invention. The occupant 10 is restrained in the vehicle seat 12 by an occupant restraint system indicated generally at 14. The restraint system 14 is a three point harness system which is secured to the vehicle chassis (not shown for clarity) at three points. Firstly, an inertia reel 16 is fixed to the car chassis at an inertia reel mount point 17. Secondly, a buckle clasp 18 is fixed to the vehicle floor at a buckle mount point 19 and lastly a pillar loop 20 is fixed to the vehicle B-pillar (not shown for clarity) at a B-pillar mount point 21.

According to an embodiment of the invention, the inertia reel 16 carries a seat belt 22 which has a seat buckle 24 arranged at one end. In the embodiment shown in FIG. 1 the occupant restraint system 14 is shown in the engaged position with the buckle 24 engaged in the buckle clasp 18. The inertia reel 16 is rotationally biased so as to pull the seat belt 22 against the body of the vehicle occupant 10 which restrains the occupant in the vehicle seat 12.

In order to release the occupant restraint system 14, the buckle 24 is disengaged from the buckle clasp 18 at which point the inertia reel winds the seat belt 22 to move the seat belt buckle 24 from the position shown in FIG. 1 to a position adjacent the B-pillar loop 20. Accordingly, in normal use, the method of engagement and release of the occupant restraint system 14 can operate in a similar fashion to those known in the art with the inertia reel 16 providing tension in the seat belt 22 so as to restrain the vehicle occupant 10 in the vehicle seat 12 and retract the belt 22 when released.

Figure 2:
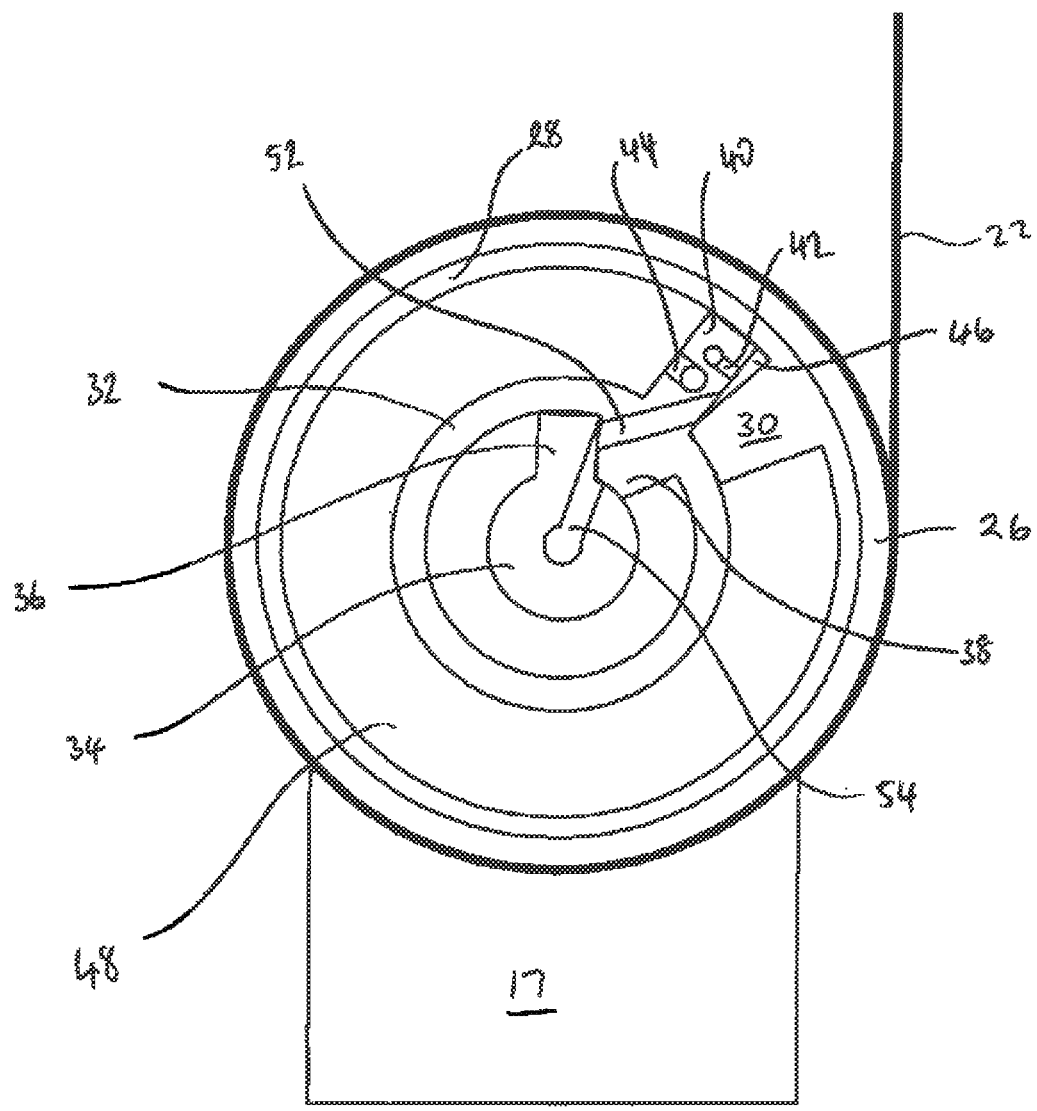
FIG. 2 is a section view of the pre-tensioning actuator of FIG. 2 in its first (rest) position.
Figure 3:
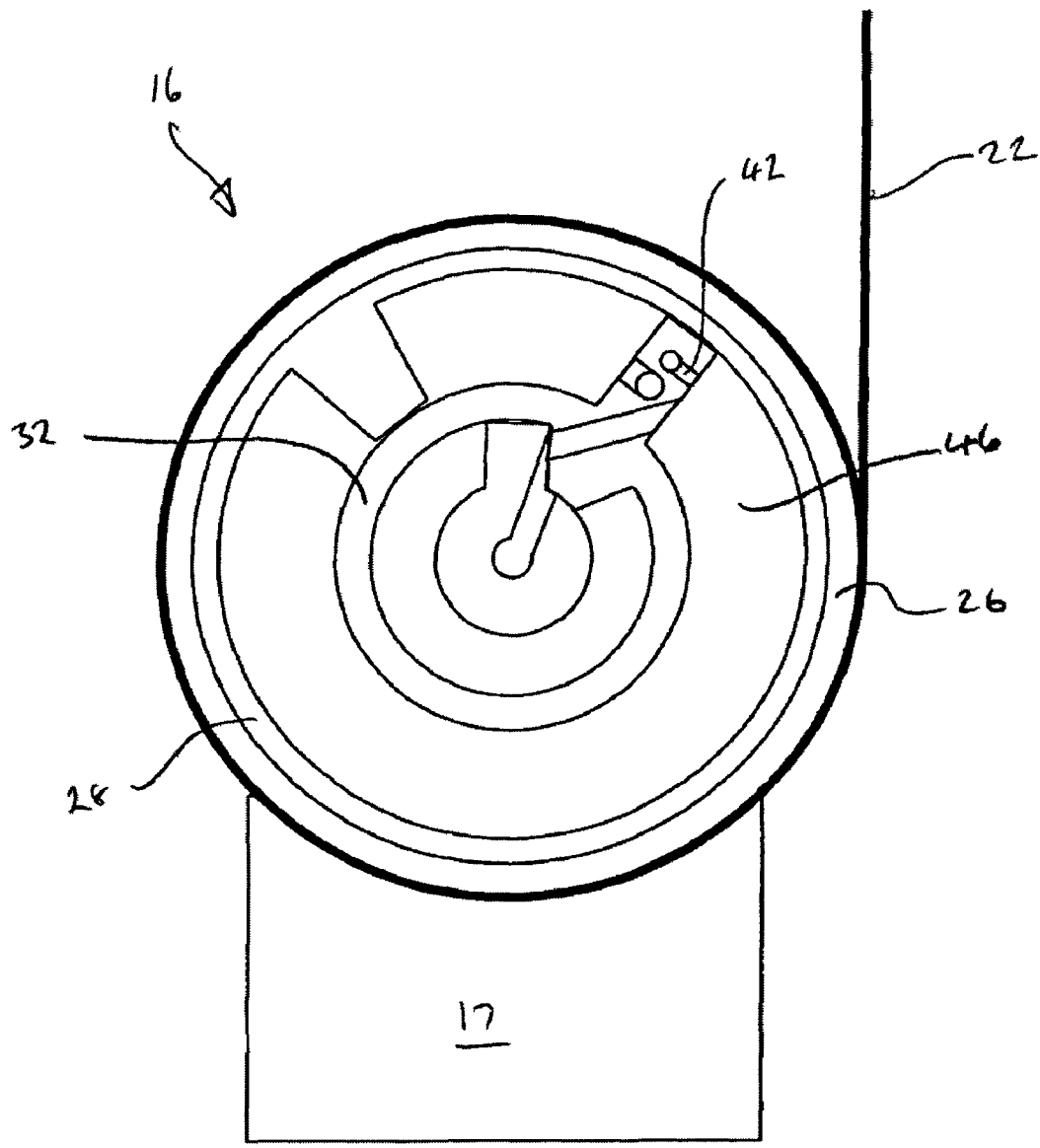
FIG. 3 is a section view of the pre-tensioning actuator of FIG. 1 shown at its second (pneumatically actuated) position.
Figure 4:
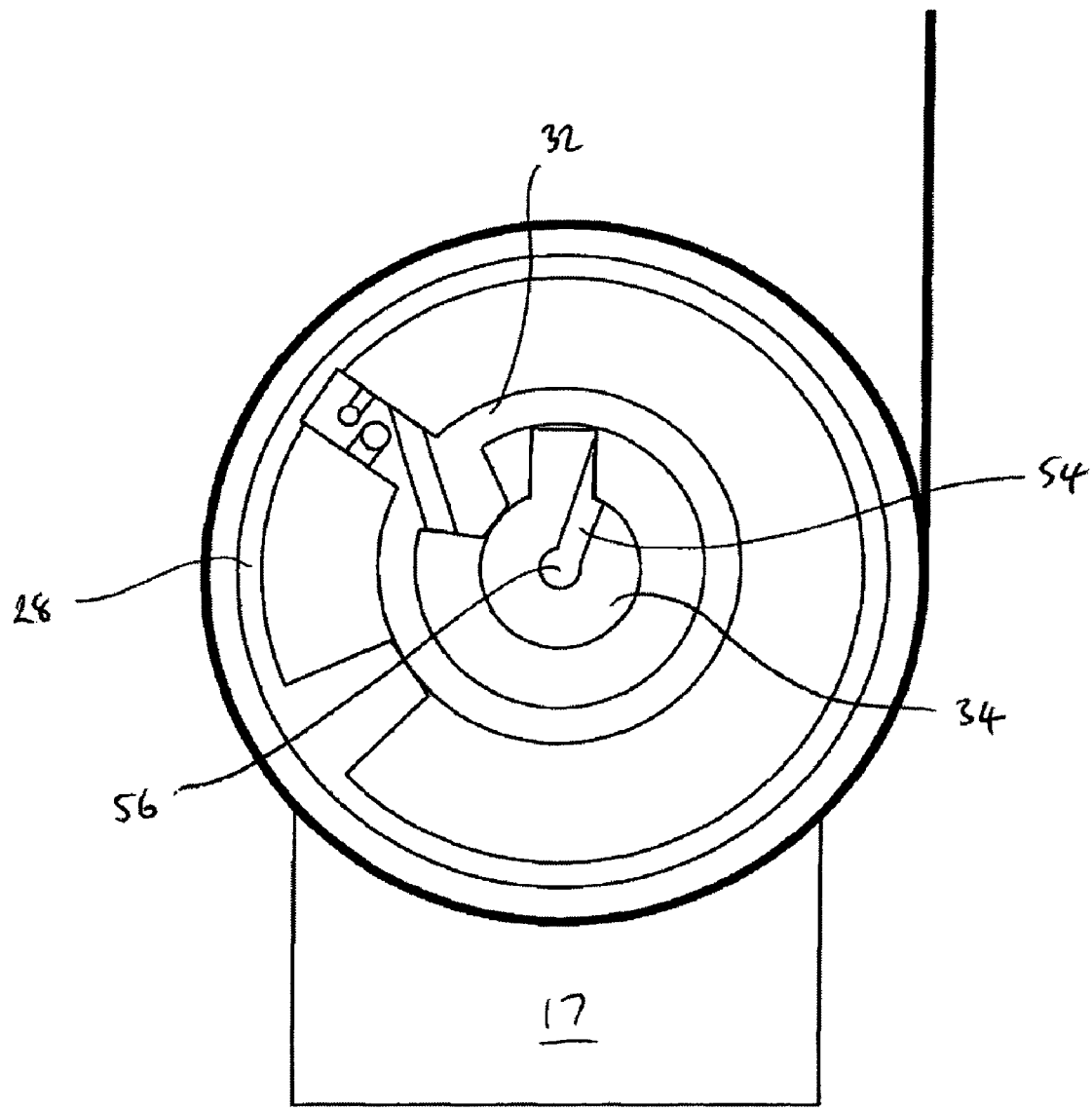
FIG. 4 is a section view of the pre-tensioning actuator of FIG. 1 shown in its third (pyrotechnically actuated) position.

Referring now to FIGS. 2 to 4, and initially FIG. 2 in particular, the inertia reel 16 is shown in greater detail according to an embodiment of the invention. Arranged at the outer profile of the inertia reel 16 is the seat belt 22 which can be rolled around a belt drum 26. Whilst only one belt depth is shown in FIG. 2 on the belt drum 26, it will be appreciated that as the inertia reel winds in the seat belt 22 upon release of the buckle 24, an additional depth of seat belt 22 will be laid on top of the inertia reel for each 360° rotation of the wheel. The belt drum 26 is driven by a drum driver 28 via a clutch (not shown for clarity). The drum driver 28 has an inwardly facing drive ridge 30 the purpose of which will be discussed in further detail shortly. Positioned radially inwardly of the drum driver 28 is a drive key 32 which is free to rotate about a fixed centre shaft 34. According to an embodiment of the invention, the fixed centre shaft 34 has a groove 36 which engages with an inwardly facing ridge 38 of the drive key 32. Positioned on the drive key 32 radially outwardly from and opposite the inwardly facing ridge 38 is an actuation ridge 40 which in the first rest position shown in FIG. 2 abuts the drive ridge 30. Accordingly, in the rest position the drum driver 28 cannot rotate in an anticlockwise direction by virtue of the inter-engagement of the drive ridge 30 with the drive key 32 which in turn is positioned against the fixed centre shaft 34.

Turning now in further detail to the actuation ridge 40 of the drive key 32 according to an embodiment of the invention, the ridge 40 defines a first compressed air port 42 and a second compressed air port 44. The ports 42, 44 can be positioned to allow compressed air to enter or be removed from a cavity 46 which is defined by the actuation ridge 40 and the drive ridge 30.

The actuation ridge 40 can also define a second inlet into the cavity 46 by way of pyrotechnic port 52 which is open to a correspondingly positioned pyrotechnic port 54 in the fixed centre shaft. The purpose of the pyrotechnic ports 52, 54 and compressed air inlet 42 and outlet 42 will be discussed in further detail shortly.

In use, the inertia reel 16 has two modes of operation, a pneumatic mode, and a pyrotechnic mode. However, as will be seen shortly, it is possible for the inertia reel 16 to operate both modes simultaneously.

Referring now to FIG. 3, according to an embodiment of the invention, upon pneumatic actuation, the belt drum 26 has rotated approximately 270° in the clockwise direction from the first position shown in FIG. 2. This rotation has been effected by the introduction of compressed air into the cavity 46 via the port 42 in the drive key 32. The consequential increase in pressure within the cavity has caused the drum driver 28 to rotate. The effect of this is to cause rotation in the belt drum 26 which in turn leads to a length of seatbelt 22 being wound onto the belt drum 26 causing a tightening of the seat belt 22. Accordingly, the inertia reel 16 as shown in FIG. 3 is in its pneumatically actuated second position which generates a partial pre-tensioning of the seat belt, for example in the event that a sport mode is selected by the driver of the vehicle. Should the driver switch off the sport mode and resume normal operation of the vehicle, the selective pre-tensioning of the seat belt 22 can be released by the compressed gas being removed via the second compressed air port 44. Under such mode of operation the drum driver 28 is rotated anticlockwise from the second position shown in FIG. 3 to the first position shown in FIG. 2. Since the pneumatic actuation of the drum driver 28 is an entirely reversible process, this selective pre-tensioning of the seatbelt can be switched on and off as many times as necessary.

Turning now to FIG. 4, according to an embodiment of the invention, pyrotechnic operation of the reel 16 has caused the drive key 32 to rotate in a clockwise direction relative to the fixed centre shaft 34 by approximately 270°. With the compressed air ports 42, 44 in a closed position, the drum driver 28 has in turn been caused to rotate by a further 270° to a third position from the second position shown in FIG. 3. The rotation of the drive key 32 relative to the fixed centre shaft 34 has been caused by the detonation of a pyrotechnic charge via a central bore 56 in the fixed centre shaft 34. The pyrotechnic detonation causes a rapid compression of the air in the pyrotechnic port 54 in the fixed centre shaft 34. Referring briefly to FIG. 3, this compressed air applies a substantial force to the drive key 32 via the inwardly facing ridge 38 which causes a rapid movement of the drive key 32 from the second position shown in FIG. 3 to the third position shown in FIG. 4. Furthermore, according to an embodiment of the invention, the compressed air also communicates with the cavity 46 via the second pyrotechnic port 52. The increased pressure in cavity 46 maintains the position of the drive ridge 30 with respect to the actuation ridge 40.

Described above is a two stage actuation of the belt driver 28 from its first rest position shown in FIG. 2 to its third position as shown in FIG. 4, via the second position of FIG. 3. The first stage in the process is a pneumatic displacement of the drum driver 28 from the first position of FIG. 2 to the second position of FIG. 3, and the second stage is a pyrotechnic deployment to further rotate the drive key 32 from the second position shown in FIG. 3 to the third position shown in FIG. 4. However, it is equally possible to actuate both modes of operation at the same time. In addition, it is possible to actuate the pyrotechnic deployment prior to the pneumatic deployment. Furthermore, in some embodiments, the pneumatic deployment may not be utilized at all. This may be the case, for example in the event of a collision at a time of normal operation when the belt driver 28 is in its first position. Referring briefly to FIG. 2, both the pneumatic actuation to allow compressed gas from the port 42 to enter the cavity 46, and the pyrotechnic detonation via the bore 56 can operate simultaneously to rapidly move the drive key 32 from its first position shown in FIG. 2 directly to its third position shown in FIG. 4. Irrespective of the initial rest position of the mechanism, the fully pre-tensioned third position can be achieved extremely rapidly in the event of a collision or impending collision.

Figure 5:
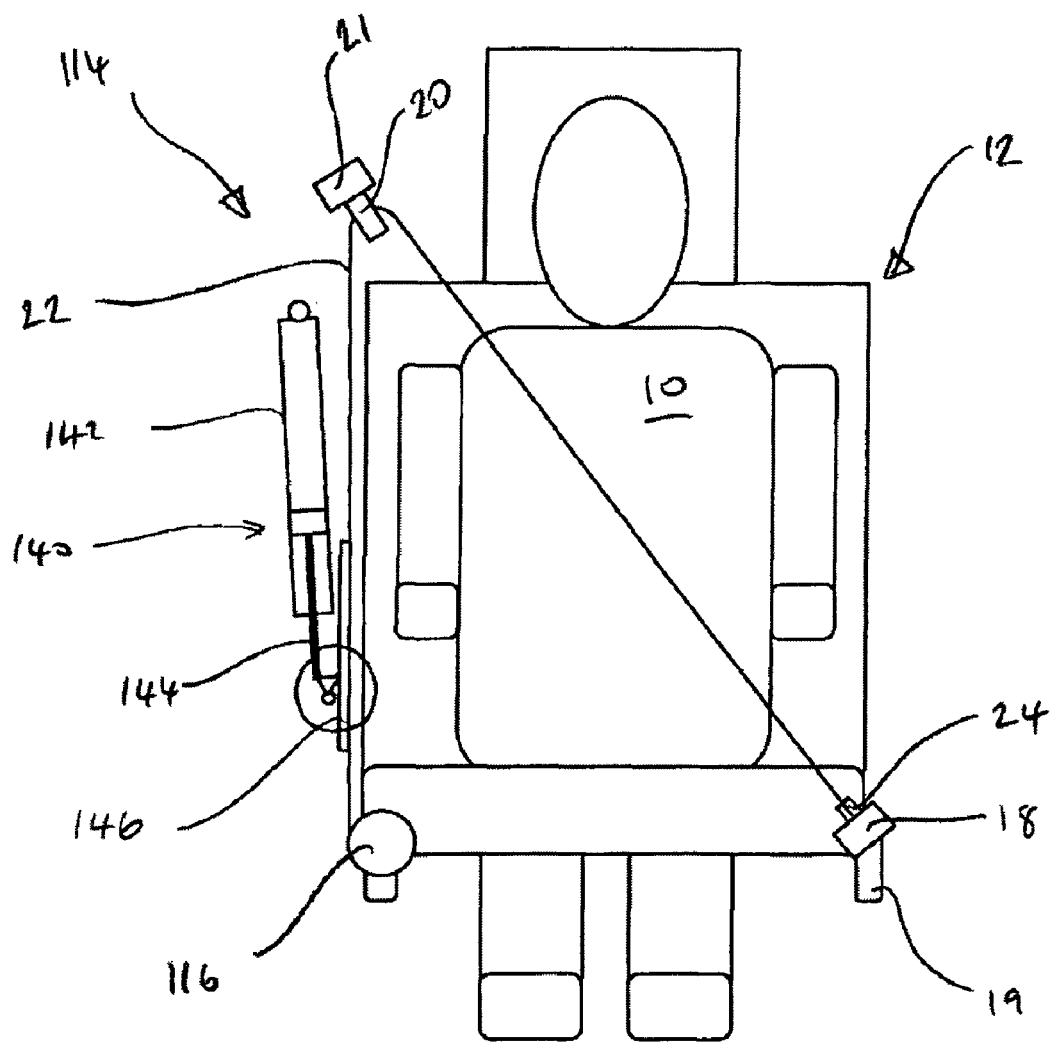
FIG. 5 is a schematic representation of a vehicle seat with a seat belt pre-tensioning actuator according to a second embodiment of the present invention.

Referring now to FIG. 5, an alternative embodiment of occupant restraint system 114 is shown with a vehicle occupant 10 sitting in a vehicle seat 12. The occupant restraint system 114 of FIG. 5 is similar to that shown in FIG. 1 in that it has an identical buckle clasp 18, buckle mount point 19, buckle 24, pillar loop 20, and B-pillar mount point 21. However, the inertia reel 116 is of a traditional design distinct from the design of the current invention as described with reference to FIGS. 2 to 4. In further contrast to the first embodiment of the invention, the occupant restraint system 114 is actuated by a linear pneumatic actuator system indicated generally at 140 which acts directly on the belt 22 as follows.

According to an embodiment of the invention, the linear pneumatic actuator system 140 includes an actuator 142 with an output 144 which acts on the seat belt 22 via a seat belt retainer 146.

Turning now to FIGS. 6 to 9 and in particular initially to FIG. 6, the actuator 140 can include an outer cylinder 148 and an inner cylinder 150. Arranged within the inner cylinder 150 is a pneumatic piston 152 attached to which is one end of the output 144. The inner cylinder 150 and pneumatic piston 152 together define a cavity 154 which is serviced by a compressed gas port 156 and pyrotechnic port 158 arranged in a base 160 of the actuator. Accordingly, the output 144 can be operated from its rest position as shown in FIG. 6 by adding or removing compressed air to or from the cavity 154 in a known manner. Arranged between the inner cylinder 150 and the base 160 is a frangible portion 162 which presents an intended area of weakness in the actuator structure. The purpose of this frangible section will be discussed in further detail shortly.

Referring now to FIG. 7, the actuator 140 has been actuated from its first rest position as shown in FIG. 6 to its second position by the addition of compressed air into the cavity 154 via port 156. It will be evident to those skilled in the art that the actuator can be operated between its first and second positions (FIGS. 6 and 7 respectively) as often as necessary so as to partially pre-tension, and release, the seat belt via the seat belt retainer 146.

Figure 8:
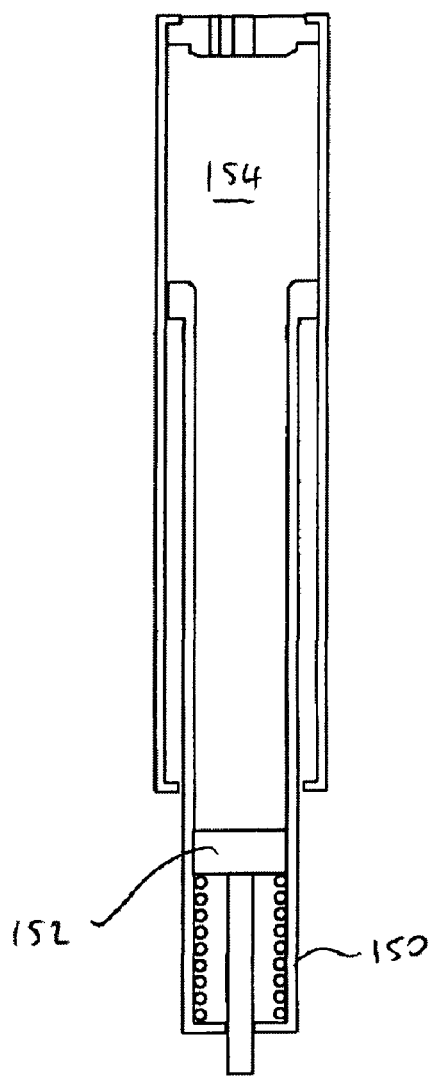
FIG. 8 is a view of the pre-tensioning actuator in FIG. 5 shown following pyrotechnic actuation from its second position.
Figure 9:
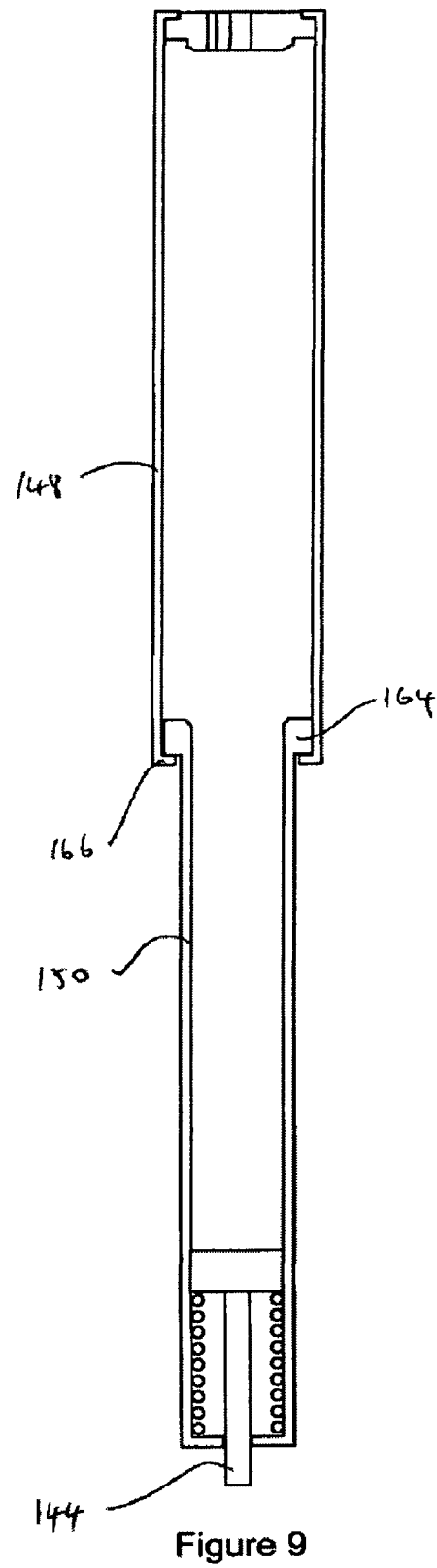
FIG. 9 is a view of the pre-tensioning actuator of FIG. 5 shown in its third (pyrotechnically actuated) position.

However, just as the first embodiment of the invention has a first pneumatic mode of operation and a further pyrotechnic mode of operation, reference to FIG. 8 shows the pneumatic piston 152 in the same position relative to the inner cylinder 150 as it was in FIG. 7, however the frangible section 162, has broken under the force of a pyrotechnic charge delivered to the cavity 154 via the pyrotechnic port 158. Accordingly, FIG. 8 captures the inner cylinder 150 as it travels extremely rapidly between the second position shown in FIG. 7 towards the third position as shown in FIG. 9 where lugs 164 on the inner surface of the inner cylinder 150 have engaged with an end portion 166 of the outer cylinder 148 to prevent further extension of the output 144 relative to the base 160. With the output in the position shown in FIG. 9, the seat belt retainer 146 has been actuated to its further most position so as to fully pre-tension the seat belt 22.

Accordingly the total actuation length (pneumatic plus pyrotechnic) is substantial despite the compact size of the actuator under normal operating conditions. This is enabled by the frangible section 162. It should be appreciated that the designation of the inner cylinder 150 and the outer cylinder 148 are merely to aid in the understanding of the invention and can be more generally referred to as a first cylinder 150 and a second cylinder 148 as the orientation may be reversed in some embodiments.

The present invention provides a restraint system that can include a pneumatic actuation and a pyrotechnic actuation. The two or more actuations may be used to pretension an occupant restraint system. In some embodiments, the pretensioning may occur in a reversible manner, such as when used in the pneumatic actuation mode. In other embodiments, the actuation may be substantially irreversible, or at least partially irreversible, such as when the pyrotechnic actuation has been used. Advantageously, the restraint system of the present invention may substantially rapidly pretension a seat belt or other restraining device. The amount of pre-tensioning may be determined based on which actuation mode is utilized.

It should also be appreciated that the orientation described above should not limit the scope of the invention. For example, the designation of clockwise or anticlockwise rotation refers to the particular drawings and therefore should not limit the scope of the present invention.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other actuation systems, and not just to the embodiments described above and shown in the accompanying figures. Accordingly, the scope of the invention should be determined from the following claims.

We claim:

1. A restraint system (14) for a seat belt (22), comprising:
   one or more pneumatic ports (42, 44) for actuating the restraint system (14) from a first position to a second position;
   one or more pyrotechnic ports (52, 54) for actuating the restraint system (14) from either the first position or the second position to a third position;
   an inertia reel (16) adapted to rotate about a center shaft (34) and including a belt drum (26) for receiving the seat belt (22); and
   wherein the inertia reel (16) comprises a drum driver (28) rotatably mounted around a drive key (32), wherein the one or more pneumatic ports (42, 44) are located in a portion of the drive key (32).

2. The restraint system (14) of claim 1, wherein pneumatic pressure supplied to one of the pneumatic ports (42, 44) actuates the drum driver (28) from a first position to a second position.

3. The restraint system (14) of claim 1, wherein at least one of the one or more pyrotechnic ports (52, 54) is located in a portion of the drive key (32).

4. The restraint system (14) of claim 1, wherein pressure supplied through one or more of the pyrotechnic ports (52, 54) actuates the drive key (32) from a first position to a second position to actuate the restraint system (14) from either the first position or the second position to the third position.

5. The restraint system (14) of claim 1, further comprising a linear actuator system (140) coupled to the seat belt (22).

6. The restraint system (14) of claim 5, further comprising a frangible portion (162).

7. A restraint system (14) for a seat belt (22), comprising:
   a linear actuator system (140) coupled to the seat belt (22);
   one or more pneumatic ports (42, 44) formed in the linear actuator system (140) for actuating the restraint system (14) from a first position to a second position;
   one or more pyrotechnic ports (52, 54) formed in the linear actuator system (140) for actuating the restraint system (14) from either the first position or the second position to a third position; and
   wherein the linear actuator system (140) comprises a first cylinder (148), a second cylinder (150), and an output (144).

8. The restraint system (14) of claim 7, wherein a pneumatic actuation increases the pressure within the first cylinder (150) to actuate the restraint system (14) from the first position to the second position.

9. The restraint system (14) of claim 7, wherein a pyrotechnic actuation increases the pressure within the second cylinder (148) to actuate the restraint system (14) from the first or the second position to the third position.

10. An inertia reel (16) for a restraint system (14), comprising:
    a drive key (32) including one or more pneumatic ports (42, 44);
    a center shaft (34) including one or more pyrotechnic ports (52, 54); and
    a drum driver (28) positioned around the drive key (32) and the center shaft (34) and movable between a first position, a second position, and at least a third position.

11. The inertia reel (16) of claim 10, wherein a pneumatic actuation increases pressure supplied by the pneumatic ports (42, 44) to actuate the drum driver (28) from the first position to the second position.

12. The inertia reel (16) of claim 10, wherein a pyrotechnic actuation increases pressure supplied by the pyrotechnic ports (52, 54) to actuate the drum driver (28) from either the first or the second position to the third position.

13. The inertia reel (16) of claim 10, wherein the drive key (32) further comprises an actuation ridge (40) that engages a drive ridge (30) formed on the drum driver (28) when the drum driver (28) is in the first position.

14. The inertia reel (16) of claim 10, wherein the center shaft (34) further comprises a number (36) that engages a ridge (38) formed in the drive key (32) when the drum driver (28) is in the first position or the second position.

15. A linear actuator (140) for a restraint system (14), comprising:
    a compressed gas port (156) in communication with a first cylinder (150) and a piston (152);
    a pyrotechnic port (158) in communication with a second cylinder (148); and
    an output (144) coupled to the piston (152) and extending from the first and second cylinders (150, 148), the output (144) movable between a first position, a second position, and at least a third position.

16. The linear actuator (140) of claim 15, wherein pressure supplied to the compressed gas port (156) actuates the output (144) from the first position to the second position.

17. The linear actuator (140) of claim 15, wherein pressure supplied to the pyrotechnic port (158) actuates the output (144) from either the first position or the second position to the at least third position.

18. The linear actuator (140) of claim 15, further comprising a frangible section (162) positioned between the first cylinder (150) and a base (160).

19. The linear actuator (140) of claim 15, wherein the output (144) is coupled to a seat belt (22).

* * * * *